March 15, 1927.
J. G. MUELLER ET AL
1,621,129
LUBRICATING CUP
Filed April 20, 1923
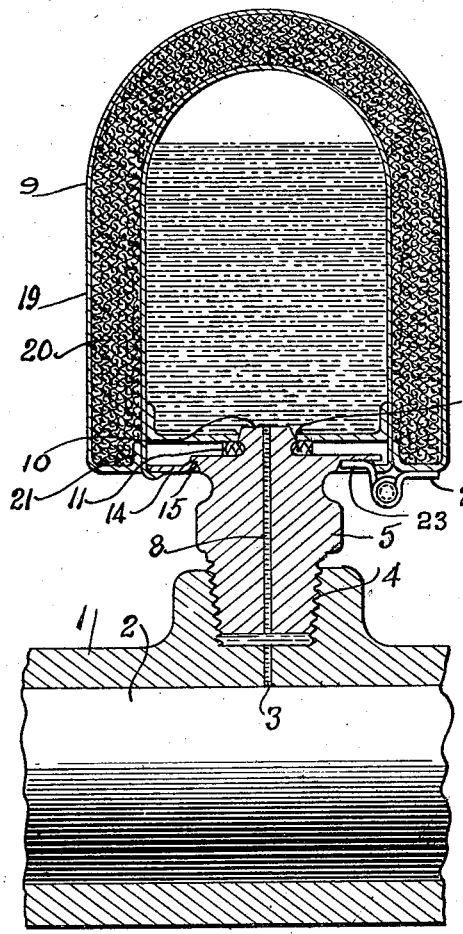
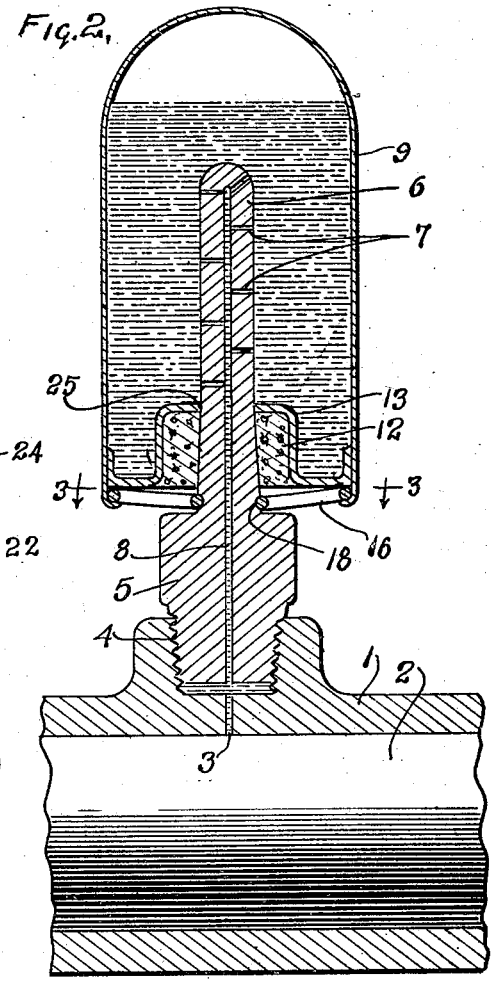
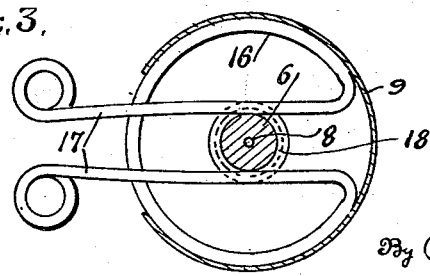
Inventors
John G. Mueller,
Carl A. Granzow,
Henry M. Granzow,
By Toulmin & Toulmin,
Attorneys Patented Mar. 15, 1927.

1,621,129

UNITED STATES PATENT OFFICE.

JOHN G. MUELLER, CARL A. GRANZOW, AND HENRY M. GRANZOW, OF DAYTON, OHIO.

LUBRICATING CUP.

Application filed April 20, 1923. Serial No. 633,406.

This invention relates to improvements in lubricating cups designed for application to journal bearings, particularly bearings so situated that they are subjected to vibration or jarring, such as will occur in automobiles and other moving vehicles.

The general object we have in view is that of providing an air tight oil cup which will exclude atmospheric pressure and dust from the surface of the oil within the cup and from which the oil will be fed to the journal bearing through an oil passageway so restricted in lateral dimensions as that the oil will not flow except for the effect of the vibrations and jarrings to which the cup is subjected.

We have found in practice that such an oil passage restricted in lateral dimensions to 10/1000ths to 15/1000ths of an inch is efficient and effective for the delivery of the oil from the shaking cup to the bearing.

There are other features of our invention which are applicable to oil cups which may be denominated stationary as distinguished from vibrating or shaking cups, as will be explained hereinafter.

In the accompanying drawings:

Fig. 1 is a sectional view of a bearing and a journal therein, as also of our improved oil cup;

Fig. 2 is a like vertical sectional view;

Fig. 3 is a transverse sectional view taken on the line 3—3 of Fig. 2.

The numeral 1 designates a bearing carrying a revolving journal 2 and having an oil or lubricant orifice 3 with a threaded recess 4 to receive the threaded end of a lug 5 upon which is mounted the oil cup.

This plug is shown in two forms, one in Fig. 1 and the other in Fig. 2. In the former figure the plug terminates at or near the bottom of the oil cup. In the latter figure it extends upward through the bottom of the cup and well into the body of the cup, say two-thirds of its height, as shown at 6 in Fig. 2. This extension has orifices 7 through which the oil passes from the cup into the oil channel within the plug and the extension.

As before stated the bearing or place where the cup will be used and for which it is especially adapted and designed is subject to vibrations or jars which are necessarily transmitted to the cup through the plug. Because of this condition of use—this vibration or shaking of the cup—we reduce and use an oil channel 8 of restricted lateral dimensions, preferably from 10/1000ths to 15/1000ths of an inch. Such a restricted channel, because of the vibration or shaking, we find will deliver the lubricant from the cup to the journal mounted in the bearing in a most efficient and effective way—without interruption and yet in such slow degree as will prevent flooding, or waste of the lubricant.

In the form shown in Fig. 1 this restricted channel 8 passes through the plug without extending up into the body of the cup, while in the form shown in Fig. 2, the plug being extended well into the cup, the channel is likewise so extended. The orifices 7 before alluded to permit the oil in the cup to enter the channel.

The other features of our invention, now about to be described, while applicable to cups which are placed on stationary bearings or bearings where there is no vibration or shaking, may be used on the cups when applied to the vibrating or shaking bearings. These features are the cup 9 fitted on the stem 10 of the plug 5 with an intervening washer 11 to prevent leakage of the lubricant, as shown in Fig. 1, or with an intervening filling of cork, as shown at 12 in Fig. 2, in which form the bottom of the cup is extended upward, as shown at 13, to form a chamber within which the cork is placed. The cork forms a packing around the neck of the plug and prevents leakage of the lubricant.

In both the forms shown the cup is removable from the plug. In Fig. 1 it is held on the plug by a yielding prong 14 which engages in a notch 15 in the edge of the plug. In this way the cup may be readily applied to or swung off of the plug on the hinge presently to be referred to.

In the form shown in Fig. 2 the cup may be lifted off of the extension of the plug but is normally secured by a spring lock composed of the circular wire band 16 seated in the lower inturned edges of the cup and of the arms 17 which tend to spring inward to seat themselves in the groove 18 of the plug. By springing the arms apart and out of the groove 18 the cup may be lifted off of the plug.

In Fig. 1 we have shown an outer casing 19 which is spaced away from the cup to leave an intervening air chamber which may be filled with a non-conductor of heat, as indicated at 20, the purpose being to protect the cup from changes in the temperature so that the oil or lubricant will not be subject to such variations.

The casing and the cup being connected together, as indicated at 21, and a hinge having one wing 22 connected to the casing and the other wing 23 attached to the plug, the casing and cup can be readily swung from the plug and the cup inverted to be refilled by pouring the lubricant into the opening 24 in which the stem 10 normally fits.

When the form of cup shown in Fig. 2 is removed it too may be inverted and the lubricant poured into the opening 25 which normally fits around the stem 7.

The lubricant works its way from the cup 9 down the one or more restricted channels to the bearing. The wall of the bore in the plug 5 forms a closure for the channels 27 so as to leave, in effect, long but otherwise minute channels for the working of the lubricant from the cup on down to the journal within the bearing as the cup undergoes vibrations.

The subject matter of this application is a division of our original application, Ser. No. 473,616, filed May 31st, 1921, in all respects save as relates to the restricted size of the lubricant channel which, in the present instance, functions by reason of the vibrations or jars imparted to the lubricant cup from the bearing on which it is mounted.

Otherwise than as to this latter feature the subject matter of this application is carved out of our other application in response to the official requirement for division.

Having thus fully described our invention, what we claim as new and desire to secure by Letters Patent, is:—

1. A lubricating device comprising an airtight oil cup having a discharge orifice at its base, a plug having an oil passage therethrough adapted to receive oil from the cup and deliver it to a bearing, and a hinge connection between the plug and cup by which the plug is detachably secured in place in the cup.

2. A lubricating device comprising a double walled airtight cup having a space between such walls, a nonconducting material in such space, a plug detachably fitted in the lower end of the cup and having an interior passage and an exterior thread, the latter adapted to have connection with bearings, and a detachable connection between the plug and the cup consisting of a spring member and hinge construction, the spring member to hold the plug in position in the cup and the hinge construction to permit the plug to be swung out of the lower end of the cup.

In testimony whereof, we affix our signatures.

JOHN G. MUELLER.
CARL A. GRANZOW.
HENRY M. GRANZOW.